(12) United States Patent
Huang et al.

(10) Patent No.: US 11,138,810 B2
(45) Date of Patent: Oct. 5, 2021

(54) JUNCTION LINE DATA GENERATION METHOD AND JUNCTION LINE DATA GENERATION SYSTEM CAPABLE OF PROCESSING THREE-DIMENSIONAL COMPONENT MODELING DATA AUTOMATICALLY

(71) Applicant: ABBOVI CO., LTD., Taipei (TW)

(72) Inventors: Chih-Yu Huang, Tainan (TW); Wu-Hung Hsu, Yilan County (TW); Shang-Wen Wong, Taipei (TW)

(73) Assignee: ABBOVI CO., LTD., Taipei (TW)

( * ) Notice: Subject to any disclaimer, the term of this patent is extended or adjusted under 35 U.S.C. 154(b) by 175 days.

(21) Appl. No.: 16/733,221

(22) Filed: Jan. 2, 2020

(65) Prior Publication Data
US 2020/0234510 A1    Jul. 23, 2020

(30) Foreign Application Priority Data

Jan. 23, 2019  (TW) .................................. 108102535

(51) Int. Cl.
 *G06K 9/00* (2006.01)
 *G06T 19/20* (2011.01)
 (Continued)

(52) U.S. Cl.
 CPC ............. *G06T 19/20* (2013.01); *A43D 1/08* (2013.01); *G06T 7/521* (2017.01); *G06T 17/00* (2013.01);
 (Continued)

(58) Field of Classification Search
 CPC ......... G06T 19/20; G06T 17/00; G06T 7/521; G06T 2207/30108; G06T 2219/2004;
 (Continued)

(56) References Cited

U.S. PATENT DOCUMENTS

| 2013/0054208 A1* | 2/2013 | Naito | G01N 33/445 703/2 |
| 2013/0132038 A1* | 5/2013 | Regan | G01B 11/24 703/1 |
| 2014/0081441 A1 | 3/2014 | Regan | |

FOREIGN PATENT DOCUMENTS

| CN | 104643409 B | 11/2019 |
| EP | 3042255 B1 | 7/2019 |

(Continued)

*Primary Examiner* — Stephen P Coleman
(74) *Attorney, Agent, or Firm* — Winston Hsu

(57) ABSTRACT

A junction line data generation method includes scanning a first junction component and a second junction component by using an image capturing device for generating three-dimensional first junction component modeling data of the first junction component and generating three-dimensional second junction component modeling data of the second junction component, simulating a first junction component structure by using the three-dimensional first junction component modeling data, simulating a second junction component structure by using the three-dimensional second junction component modeling data, and generating junction line data between the first junction component and the second junction component by optionally deforming the first junction component structure and/or the second junction component structure according to the first junction component structure and the second junction component structure.

14 Claims, 12 Drawing Sheets

(51) Int. Cl.
*G06T 17/00* (2006.01)
*A43D 1/08* (2006.01)
*G06T 7/521* (2017.01)

(52) U.S. Cl.
CPC ............... *G06T 2207/30108* (2013.01); *G06T 2219/2004* (2013.01)

(58) Field of Classification Search
CPC .... G06T 2219/2008; G06T 2219/2021; A43D 1/08; A43D 11/00; A43D 2200/60; A43D 25/18; A43B 9/00
USPC ......................................................... 382/141
See application file for complete search history.

(56) References Cited

FOREIGN PATENT DOCUMENTS

| | | |
|---|---|---|
| TW | I589243 B | 7/2017 |
| WO | 2013/074937 A1 | 5/2013 |

\* cited by examiner

JUNCTION LINE DATA GENERATION METHOD AND JUNCTION LINE DATA GENERATION SYSTEM CAPABLE OF PROCESSING THREE-DIMENSIONAL COMPONENT MODELING DATA AUTOMATICALLY

BACKGROUND OF THE INVENTION

1. Field of the Invention

The present invention illustrates a junction line data generation method and a junction line data generation system, and more particularly, a junction line data generation method and a junction line data generation system capable of processing three-dimensional component modeling data automatically.

2. Description of the Prior Art

With the rapid advancement of technologies, many production lines and machining procedures are performed automatically for reducing labor costs and human errors. For example, a production line of automatically manufacturing products can include a loading process, a shipping process, an assembly process, and an inspection process. For manufacturing mass productions such as a large number of shoes, a fast and instant (i.e., real-time) automated production process becomes a significant trend of a shoemaking technology.

At present, when a footwear equipment manufacturer manufactures shoes, a scanning machine often uses laser light for scanning a shoe model along one axial direction. The scanning machine also uses a receiver for receiving laser light energy reflected by a surface of the shoe model for determining a digital profile of the shoe model according to the shape of the received laser light. Further, the scanning machine can generate a digital model of the shoes. According to the digital model of the shoes, a glued area can be determined by the scanning machine for facilitating a fitting process of attaching an upper with a sole of each shoe.

However, since the upper and the sole of each shoe are elastic components having curved surfaces, some drawbacks are introduced to current shoemaking technology of the footwear equipment manufacturer. First, at least one blind spot is unavoidable when the laser light is used for scanning the shoe model along one axial direction. In other words, current scanning technology of the footwear equipment manufacturer cannot convert detail structures of all elastic components of the shoes to digital models. Second, an automated and real-time production process is not applied to the current shoemaking technology of the footwear equipment manufacturer. The reason is illustrated below. Since the digital model of the shoes lacks some detailed structure, the digital model of the shoes needs to be compared with several sample models or templates stored in a memory of the scanning machine for mapping to a correct model by using a maximum likelihood approach. Third, the current shoemaking technology of the footwear equipment manufacturer cannot accurately generate a bite line, thereby increasing additional workloads of manufacturers, especially in a coating glue process.

SUMMARY OF THE INVENTION

In an embodiment of the present invention, a junction line data generation method is disclosed. The junction line data generation method comprises scanning a first junction component and a second junction component by using an image capturing device for generating three-dimensional first junction component modeling data of the first junction component and generating three-dimensional second junction component modeling data of the second junction component, simulating a first junction component structure by using the three-dimensional first junction component modeling data of the first junction component, simulating a second junction component structure by using the three-dimensional second junction component modeling data of the second junction component, and generating junction line data between the first junction component and the second junction component by optionally deforming the first junction component structure and/or the second junction component structure according to the first junction component structure and the second junction component structure. The first junction component and/or the second junction component is an elastic component. The first junction component and the second junction component are closely attached according to variations of the junction line data.

In another embodiment of the present invention, a junction line data generation system is disclosed. The junction line data generation system comprises an image capturing device, a processor, and a memory. The image capturing device is configured to scan a first junction component and a second junction component. The processor is coupled to the image capturing device and configured to process three-dimensional modeling data of the first junction component and the second junction component, and configured to generate junction line data accordingly. The memory is coupled to the processor and configured to buffer the three-dimensional modeling data. After the first junction component and the second junction component are scanned by the image capturing device, the processor generates three-dimensional first junction component modeling data of the first junction component to the memory, and generates three-dimensional second junction component modeling data of the second junction component to the memory. The processor uses the three-dimensional first junction component modeling data of the first junction component for simulating a first junction component structure. The processor uses the three-dimensional second junction component modeling data of the second junction component for simulating a second junction component structure. The processor generates the junction line data between the first junction component and the second junction component by optionally deforming the first junction component structure and/or the second junction component structure according to the first junction component structure and the second junction component structure. The first junction component and/or the second junction component is an elastic component. The first junction component and the second junction component are closely attached according to the junction line data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
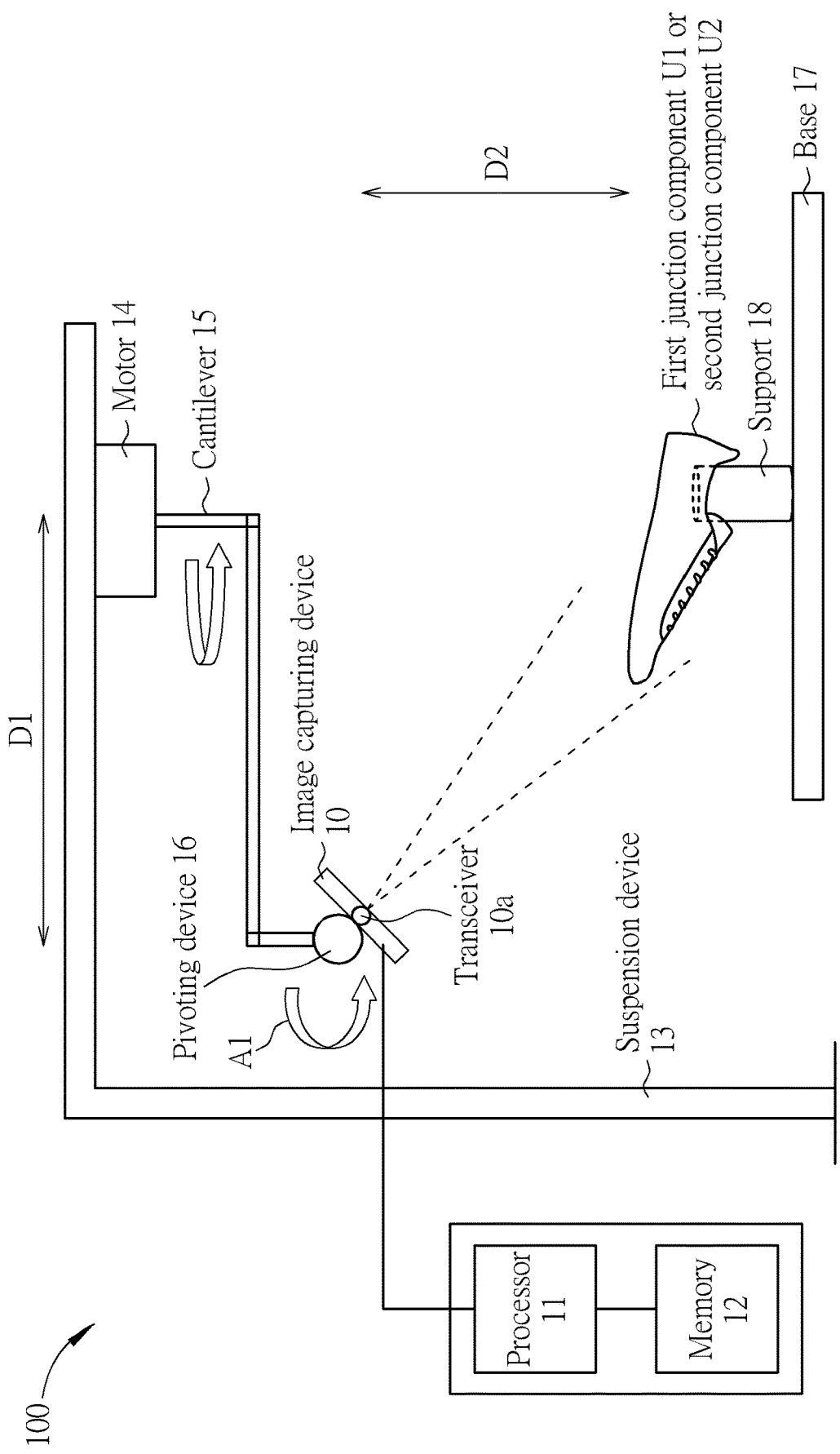
FIG. 1 is a structure of a junction line data generation system according to an embodiment of the present invention.

FIG. 1 is a structure of a junction line data generation system 100 according to an embodiment of the present invention. The junction line data generation system 100 can be used for generating digital data of the junction line between any two junction components. In other words, the junction line data generation system 100 can generate the junction line data for combining any two junction components. For example, the junction line data generation system 100 can be applied to shoemaking technologies. Therefore, in the following, a first junction component can be regarded as an upper of a shoe. A second junction component can be regarded as a sole of the shoe. The junction line data can be regarded as bite line data. The upper of the shoe and the sole of the shoe can be closely attached according to the bite line data. The junction line data generation system 100 includes an image capturing device 10, a processor 11, and a memory 12. The image capturing device 10 can be any lens or camera with at least one photosensitive element. In the junction line data generation system 100, the image capturing device 10 can be suspended above a base 17 by using a suspension device 13, a cantilever 15, and a pivoting device 16 for scanning the first junction component U1 and/or the second junction component U2. The cantilever 15 can be rotated by using a motor 14. The pivoting device 16 can be used for adjusting a tilt angle A1 of the image capturing device 10 (i.e., hereafter, say "a first angle A1"). Lengths of the suspension device 13 and the cantilever 15 can also be adjusted. In other words, a distance D2 between the image capturing device 10 and the base 17 can be adjusted. A distance D1 between the motor 14 (i.e., the motor 14 can be regarded as a rotation center) and the image capturing device 10 can be adjusted. Further, the first angle A1 of the image capturing device 10 can also be adjusted. However, the structure for suspending the image capturing device 10 of the junction line data generation system 100 is not limited by FIG. 1. In the junction line data generation system 100, a support 18 can be disposed on the base 17 for supporting the first junction component U1 or the second junction component U2. For example, when the first junction component U1 (the upper of the shoe) is placed on the support 18, the image capturing device 10 can set the first junction component U1 as a scanning target and move along a nonlinear path for scanning the first junction component U1. The image capturing device 10 can include a transceiver 10a for emitting laser light to the first junction component U1 and then receiving laser light energy reflected by the first junction component U1. In other words, the image capturing device 10 can generate a plurality of images with different angles of view corresponding to the first junction component U1 after the image capturing device 10 moves along the nonlinear path. Further, the nonlinear path can be a closed path, such as a circular path or an oval path. The nonlinear path can be a spiral path. Similarly, the image capturing device 10 can scan the second junction component U2. Further, the first junction component U1 and the second junction component U2 can be individually scanned by using two different image capturing devices. The first junction component U1 and the second junction component U2 can be scanned together. The first junction component U1 (i.e., the upper of the shoe) can be scanned along the closed path. The second junction component U2 (i.e., the sole of the shoe) can be scanned along a linear path. Any technology modification for scanning the first junction component U1 and the second junction component U2 falls into the scope of the present invention. Further, any attached mode can be applied to the first junction component U1 and the second junction component U2. For example, the first junction component U1 can be combined with the second junction component U2 by using an overlaid method, an attaching method, or a nested method. In other words, any method for combining the first junction component U1 with the second junction component U2 according to the junction line data fall into the scope of the present invention.

The processor 11 is coupled to the image capturing device 10 for processing three-dimensional modeling data of the first junction component U1 and the second junction component U2, and generating the junction line data accordingly. The processor 11 can be any signal processing device such as a central processing unit, a microprocessor, or a graphics processing unit. The processor 11 can be used for executing three-dimensional image simulation software. After the first junction component U1 and the second junction component U2 are scanned by the laser light, the processor 11 can generate three-dimensional first junction component modeling data of the first junction component U1 to the memory 12. The processor 11 can generate three-dimensional second junction component modeling data of the second junction component U2 to the memory 12. Further, the processor 11 can use the three-dimensional image simulation software for simulating a first junction component structure according to the three-dimensional first junction component modeling data. Similarly, the processor 11 can use the three-dimensional image simulation software for simulating a second junction component structure according to the three-dimensional second junction component modeling data. Then, the processor 11 can generate the junction line data between the first junction component U1 and the second junction component U2 by optionally deforming the first junction component structure and/or the second junction component structure according to the first junction component structure and the second junction component structure. The memory 12 is coupled to the processor 11 for buffering the three-dimensional modeling data. The memory 12 can be any data storage device, such as a hard disk, a cloud data space, a non-volatile memory, or a dynamic memory. The three-dimensional image simulation software can be installed in the memory 12 for assisting the processing device 11 to generate the junction line data. Further, the processor 11 and the memory 12 can be integrated into an operating machine or a computer. A user can reasonably adjust the parameters of the three-dimensional image simulation software, such as a scanning resolution, a distribution and a density of image sampling points, and/or a scanning time length.

As previously mentioned, the image capturing device 10 can be used for scanning the first junction component U1 and/or the second junction component U2. Then, the processor 11 can generate corresponding three-dimensional simulated structure models. The three-dimensional simulated structure models can be generated by using a "cloud point" technology. Here, the "cloud point" technology can be defined as an image processing technology for modeling three-dimensional image objects by using three-dimensional scanning data. The three-dimensional scanning data carries information of scanning characteristics of sampling points. Information of each sampling point can include three-dimensional coordinate data, color information (R,G,B) data, and reflectivity of a surface. However, the junction line data generation system 100 is not limited to generating the three-dimensional simulated structure models by using the "cloud point" technology. Any reasonable method or software program can be applied to the junction line data generation system 100 for generating the three-dimensional simulated structure models. Further, before the image capturing device 10 moves along the nonlinear path for performing a scanning process, the processor 11 can calibrate image coordinate offset according to current position coordinates of the image capturing device 10, a scanning angle of the image capturing device 10, and a distance between the image capturing device 10 and an object (i.e., the first junction component U1 and/or the second junction component U2) placed on the base 17. Therefore, the image capturing device 10 can provide accurate scanning results.

Figure 2:
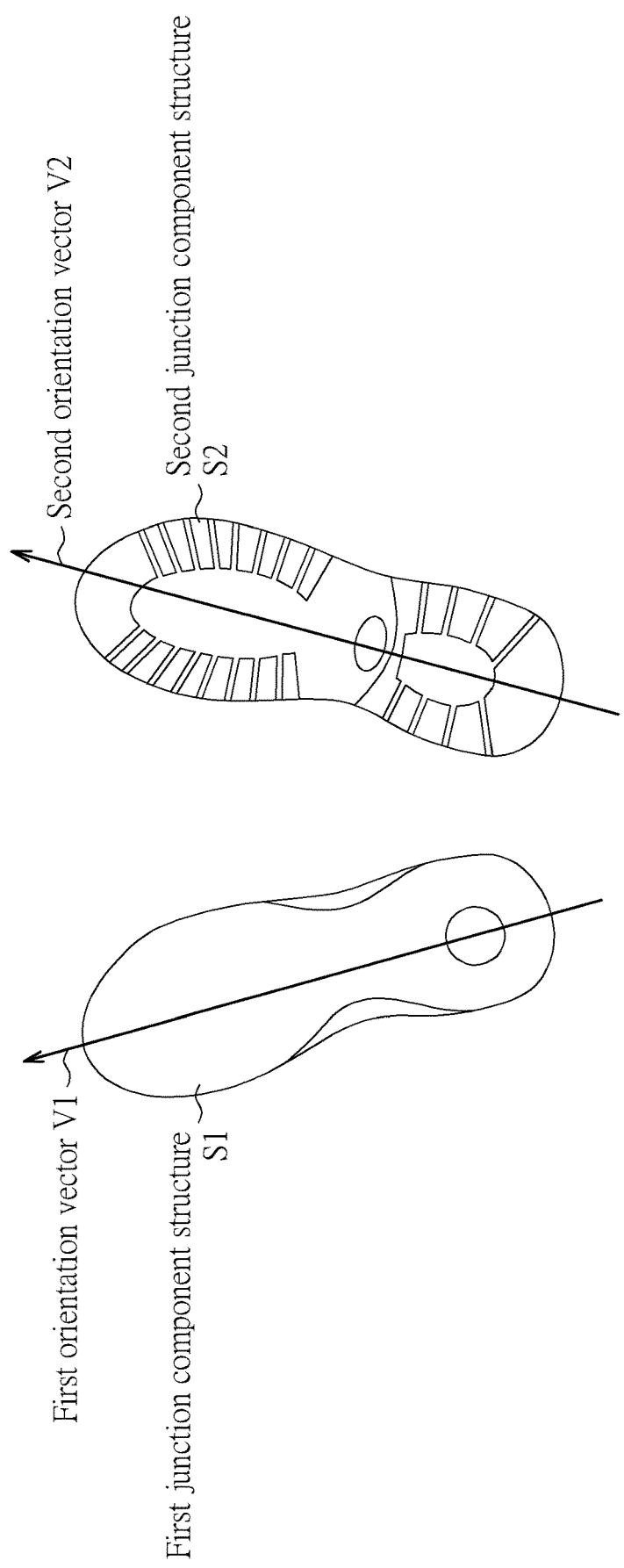
FIG. 2 illustrates initial orientations of a first junction component structure and a second junction component structure in the junction line data generation system in FIG. 1.
Figure 3:
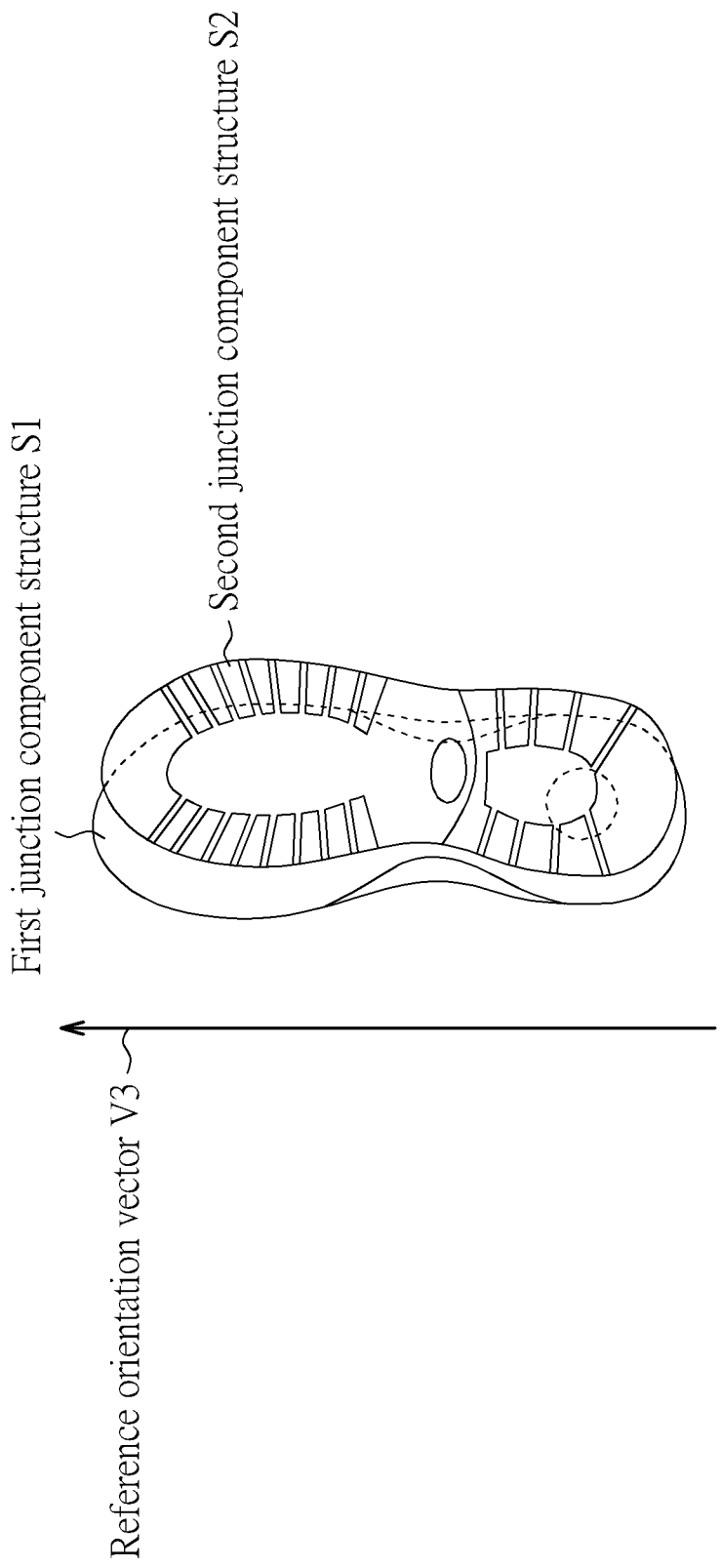
FIG. 3 is an illustration of aligning the first junction component structure with the second junction component structure in the junction line data generation system in FIG. 1.

FIG. 2 illustrates initial orientations of the first junction component structure S1 and the second junction component structure S2 in the junction line data generation system 100. FIG. 3 is an illustration of aligning the first junction component structure S1 with the second junction component structure S2 in the junction line data generation system 100. As previously mentioned, the processor 11 can generate (or say, simulate) the first junction component structure S1 and the second junction component structure S2. The first junction component structure S1 and the second junction component structure S2 can be regarded as two digital models of simulating structures of the first junction component U1 and the second junction component U2 by using the three-dimensional image simulation software. Further, since the processor 11 is designed to simulate a combination model of the first junction component U1 and the second junction component U2, the first junction component structure S1 is required to align with the second junction component structure S2. In FIG. 2, the processor 11 can acquire a first orientation vector V1 of the first junction component structure S1 according to the three-dimensional first junction component modeling data. The first orientation vector V1 can be regarded as a maximum gradient direction of the first junction component structure S1, thereby called as "orientation" of the first junction component structure S1. Similarly, the processor 11 can acquire a second orientation vector V2 of the second junction component structure S2 according to the three-dimensional second junction component modeling data. The second orientation vector V2 can be regarded as a maximum gradient direction of the second junction component structure S2, thereby called as "orientation" of the second junction component structure S2. Then, as shown in FIG. 3, the processor 11 can align the first junction component structure S1 with the second junction component structure S2 according to the first orientation vector V1 and the second orientation vector V2. After the first junction component structure S1 and the second junction component structure S2 are aligned, their orientation vectors are identical. For example, after the first orientation vector V1 of the first junction component structure S1 is aligned with the second orientation vector V2 of the second junction component structure S2 by the processor 11, orientation vectors of the first junction component structure S1 and the second junction component structure S2 coincide with a reference orientation vector V3. However, in FIG. 2 and FIG. 3, the processor 11 only aligns the first junction component structure S1 and the second junction component structure S2. The first junction component structure S1 and the second junction component structure S2 are not attached yet.

Figure 4:
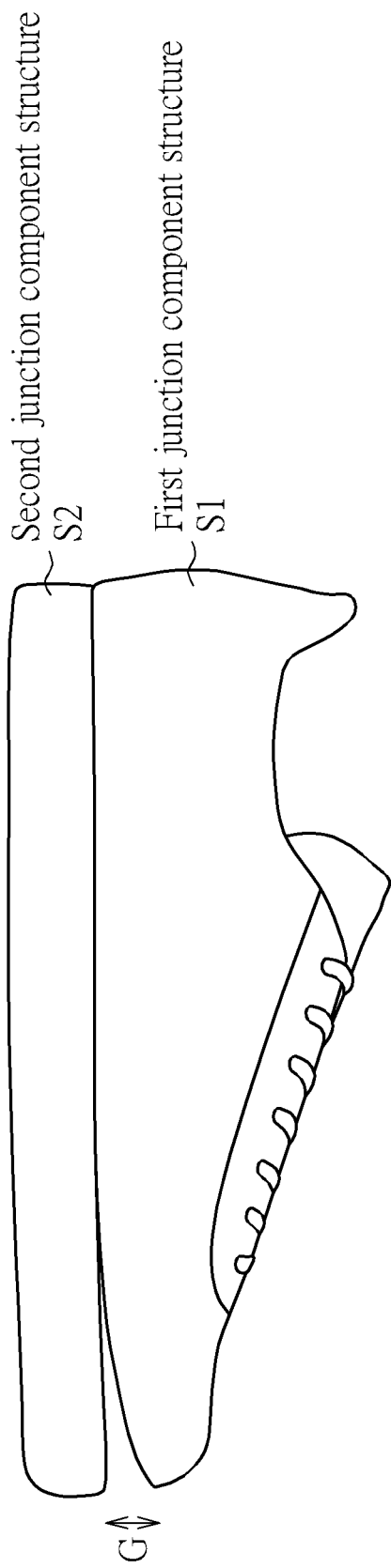
FIG. 4 is a lateral view of initially combining the first junction component structure with the second junction component structure in the junction line data generation system in FIG. 1.

FIG. 4 is a lateral view of initially combining the first junction component structure S1 with the second junction component structure S2 in the junction line data generation system 100. As previously mentioned, the processor 11 can align the first junction component structure S1 and the second junction component structure S2. Further, the first junction component structure S1 and/or the second junction component structure S2 is an elastic structure. For example, when the first junction component structure S1 is the upper of the shoe and the second junction component structure S2 is the sole of the shoe, since the first junction component structure S1 may be bent at a certain portion, the second junction component structure S2 cannot be completely attached with the first junction component structure S1. For example, a front portion of the first junction component structure S1 is usually bent. In other words, after the first junction component structure S1 and the second junction component structure S2 are aligned, a front gap G may be introduced between the first junction component structure S1 and the second junction component structure S2.

Figure 5:
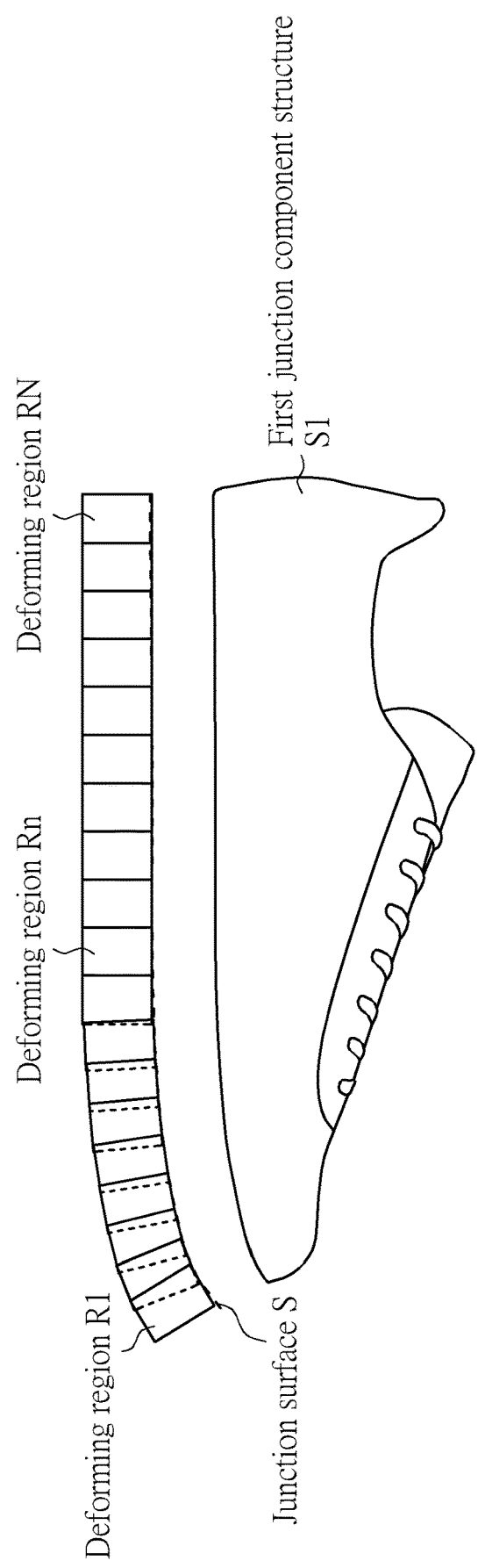
FIG. 5 is an illustration of generating a plurality of deforming regions by converting a part of or entire second junction component structure into a plurality of lattices in the junction line data generation system in FIG. 1.

FIG. 5 is an illustration of generating a plurality of deforming regions R1 to RN by converting a part of or entire second junction component structure S2 into a plurality of lattices in the junction line data generation system 100. As previously mentioned, in order to attach the first junction component structure S1 with the second junction component structure S2, the processor 11 can generate the plurality of deforming regions R1 to RN by converting at least a part of the second junction component structure S2 into the plurality of lattices. For example, the processor 11 can partition the entire second junction component structure S2 into the plurality of deforming regions R1 to RN. An $n^{th}$ deforming region is denoted as Rn. The deforming regions R1 to RN can be a plurality of stereoscopic deforming regions. Further, a distribution of the deforming regions R1 to RN, sizes of the deforming regions R1 to RN, and the amount of the deforming regions R1 to RN can be user-defined. For example, the processor 11 can virtually partition a part of or entire second junction component structure S2 into different volumetric deforming regions R1 to RN by using any horizontal allocation method, any vertical allocation method, or any partitioning method. In the junction line data generation system 100, after the deforming regions R1 to RN are generated, the processor 11 can acquire a plurality of correlations between the plurality of deforming regions R1 to RN and a side of the first junction component structure S1. The plurality of correlations can be defined as quantitative correlations of gap (distance) variations between the plurality of deforming regions R1 to RN and the side of the first junction component structure S1. The processor 11 can adjust a deforming degree of at least one deforming region for closely attaching the second junction component structure S2 with the first junction component structure S1 according to the plurality of correlations. Here, the deforming degree of the at least one deforming region can be defined as a deformation processed by rotating, compressing, stretching, overlapping, or reallocating the at least one deforming region. After the deforming degree of the at least one deforming region is adjusted by the processor 11, a junction surface S of the second junction component structure S2 can correspond to a junction surface (i.e., for example, a certain side surface) of the first junction component structure S1. Thus, the first junction component structure S1 can be perfectly combined (attached) with the second junction component structure S2.

Figure 6:
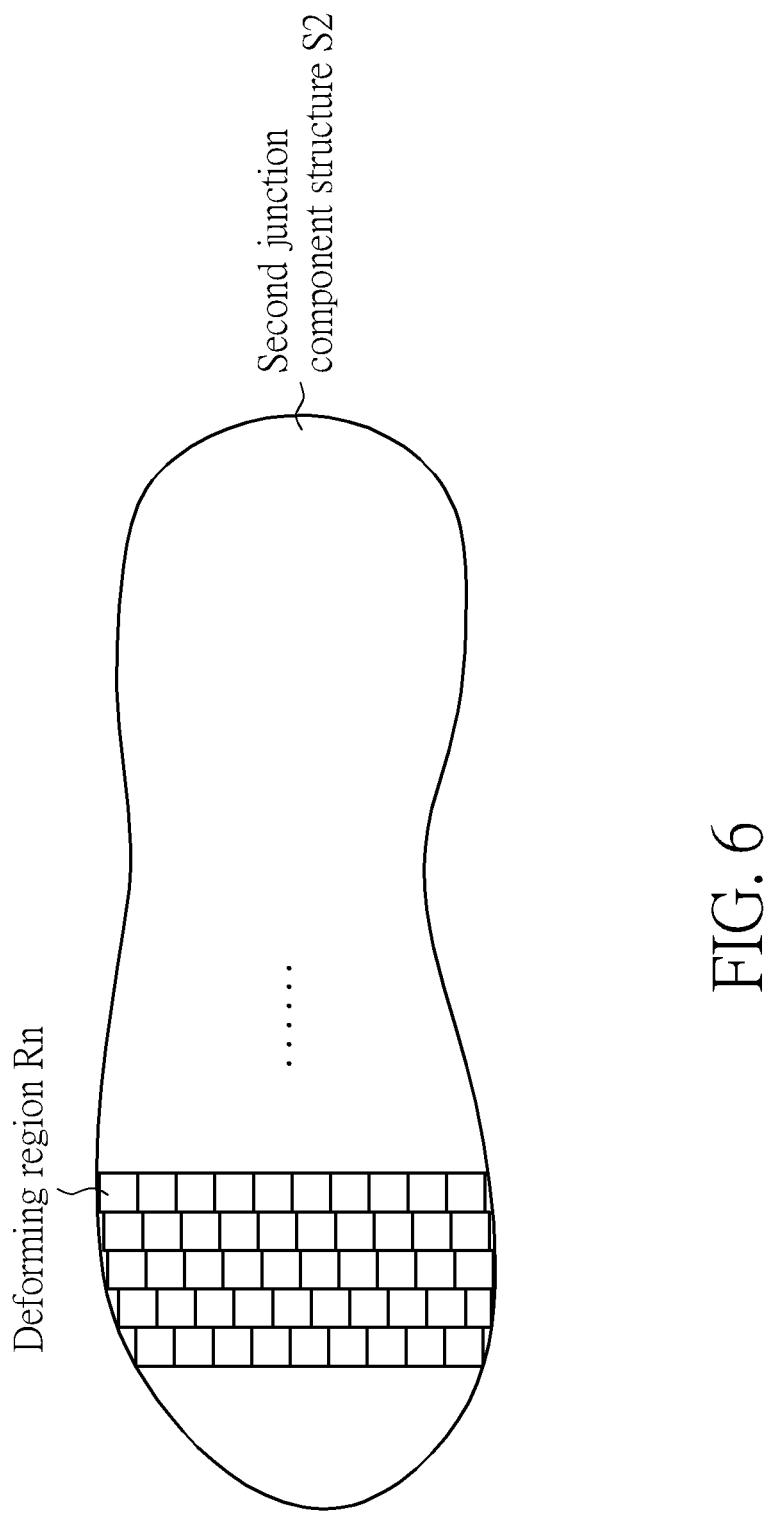
FIG. 6 is a front view of converting the part of or entire second junction component structure into the plurality of lattices in the junction line data generation system in FIG. 1.

FIG. 6 is a front view of converting the part of or entire second junction component structure into the plurality of lattices in the junction line data generation system 100. Since the second junction component structure S2 is a stereoscopic model, the deforming regions R1 to RN generated by the processor 11 can be the plurality of stereoscopic deforming regions, such as cubic regions. Here, since a distributed range of the deforming regions R1 to RN can be denoted as a range of entire second junction component structure S2, configurations of deforming degrees of the deforming regions R1 to RN depend on variations of a surface of the second junction component structure S2. Further, in the junction line data generation system 100, the amount of deforming regions R1 to RN can be adjusted according to an actual situation.

Figure 7:
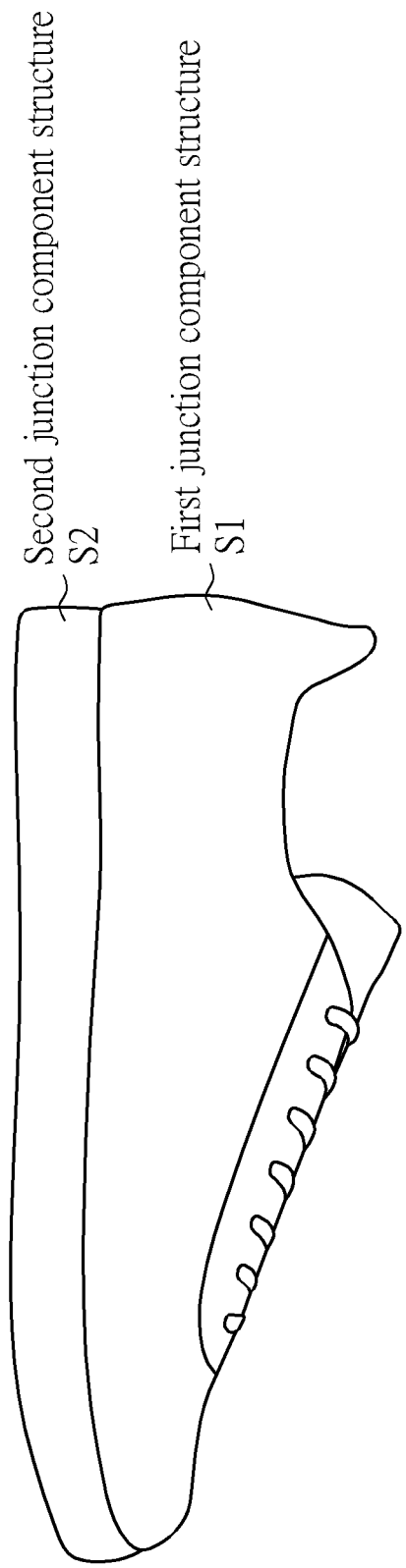
FIG. 7 is a lateral view of combining the second junction component structure with the first junction component structure in the junction line data generation system in FIG. 1 after the second junction component structure is adjusted.

FIG. 7 is a lateral view of combining the second junction component structure S2 with the first junction component structure S1 in the junction line data generation system 100. Comparing FIG. 4 with FIG. 7, in FIG. 4, the first junction component structure S1 and/or the second junction component structure S2 is an elastic component structure. For a shoemaking technology, generally, the second junction component structure S2 is the elastic component structure. The first junction component structure S1 is the elastic component structure or a non-elastic component structure. However, the present invention is not limited to the elastic component structure of the shoemaking technology. Since the first junction component structure S1 may be bent at the certain portion, the second junction component structure S2 cannot be completely attached with the first junction component structure S1. For example, the front portion of the first junction component structure S1 is usually bent. However, the present invention is not limited to a location and a range of a bent portion of the first junction component structure S1. After the second junction component structure S2 is deformed, the first junction component structure S1 can be perfectly combined (attached) with the second junction component structure S2 in the lateral view. In other words, the front gap G between the first junction component structure S1 and the second junction component structure S2 can be minimized.

Figure 8:
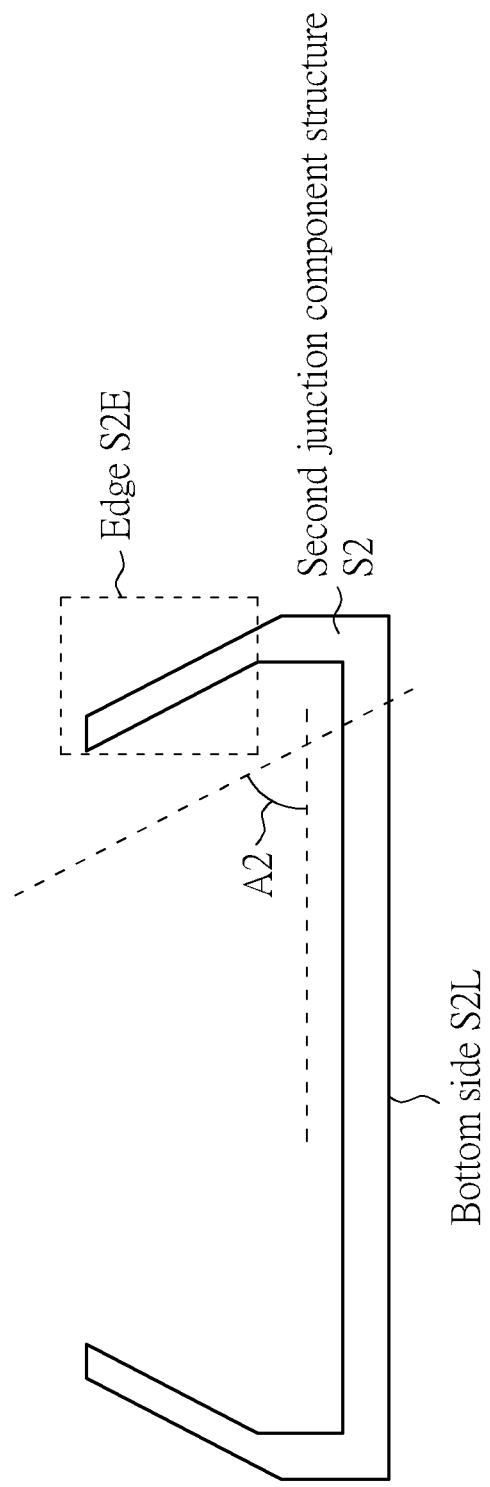
FIG. 8 is an illustration of an initial angle between an edge of a bottom side of the second junction component structure and the bottom side of the second junction component structure in the junction line data generation system in FIG. 1.

FIG. 8 is an illustration of an initial angle A2 between an edge portion S2E of the second junction component structure S2 and the bottom side S2L of the second junction component structure S2 in the junction line data generation system 100. When the second junction component structure S2 is a sole of the shoe, since the second junction component structure S2 may include a rubber material having elasticity, the edge portion S2E of the second junction component structure S2 may be inwardly contracted. Therefore, the initial angle A2 between the edge portion S2E of the bottom side S2L of the second junction component structure S2 and the bottom side S2L of the second junction component structure S2 may not be suitable for an assembly process. The initial angle A2 is called as a second angle A2 hereafter. When the second angle A2 is too small, the first junction component structure S1 and the second junction component structure S2 cannot be directly combined. Therefore, the processor 11 can adjust the second angle A2 for facilitating the combination of the first junction component structure S1 and the second junction component structure S2, as illustrated below.

Figure 9:
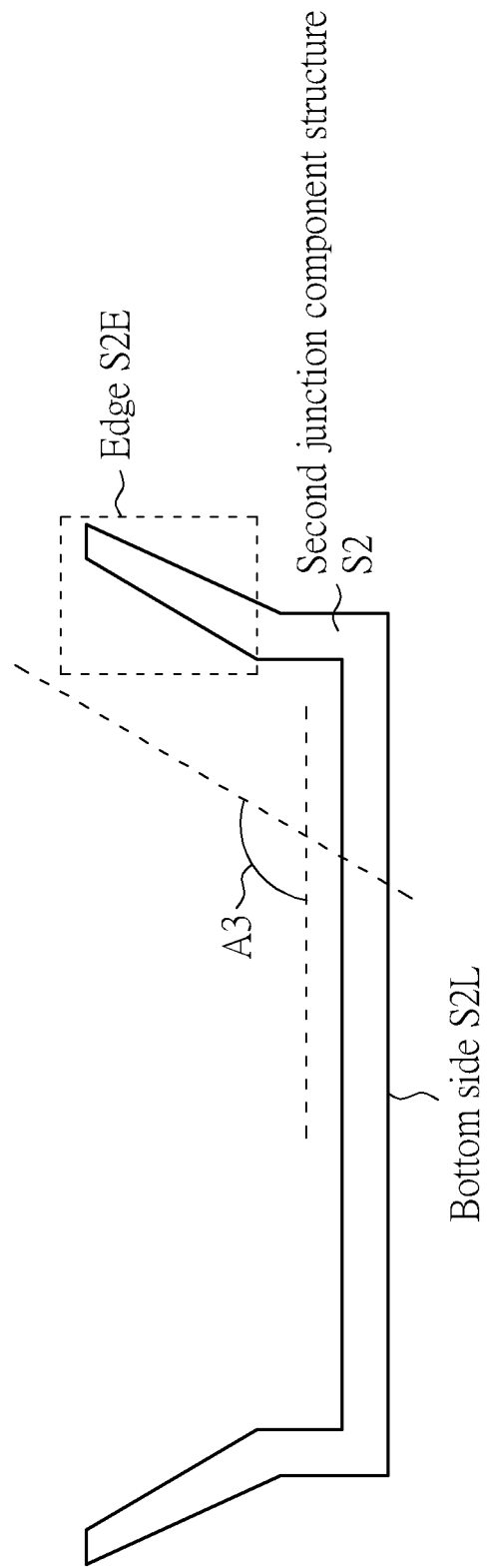
FIG. 9 is an illustration of an angle between the edge of the bottom side of the second junction component structure and the bottom side of the second junction component structure in the junction line data generation system in FIG. 1 after the second junction component structure is adjusted.

FIG. 9 is an illustration of an angle between the edge portion S2E of the bottom side S2L of the second junction component structure S2 and the bottom side S2L of the second junction component structure S2 in the junction line data generation system 100 after the second junction component structure S2 is adjusted. As previously mentioned, the processor 11 can acquire the second angle A2 between the edge portion S2E of the bottom side S2L of the second junction component structure S2 and the bottom side S2L of the second junction component structure S2. When the second angle A2 is too small, the processor 11 can adjust the edge portion S2E of the second junction component structure S2 according to surface information (i.e., junction surface information) of the first junction component structure S1. After the edge portion S2E of the second junction component structure S2 is adjusted, the second angle A2 is adjusted accordingly. Therefore, a junction surface of the first junction component structure S1 can be fitted perfectly with a junction surface of the second junction component structure S2. Further, since the second junction component structure S2 may include an elastic rubber material, the edge portion S2E of the bottom side S2L of the second junction component structure S2 may be deformed outwardly, or may be deformed due to temperature, human error, and tolerance of production. Therefore, a user can decide if the adjustment of the second angle A2 is required, or decide if the second angle A2 is adjusted to approach a third angle A3. The third angle A3 can be greater than or smaller than a right angle. Any reasonable technology modification falls into the scope of the present invention.

Figure 10:
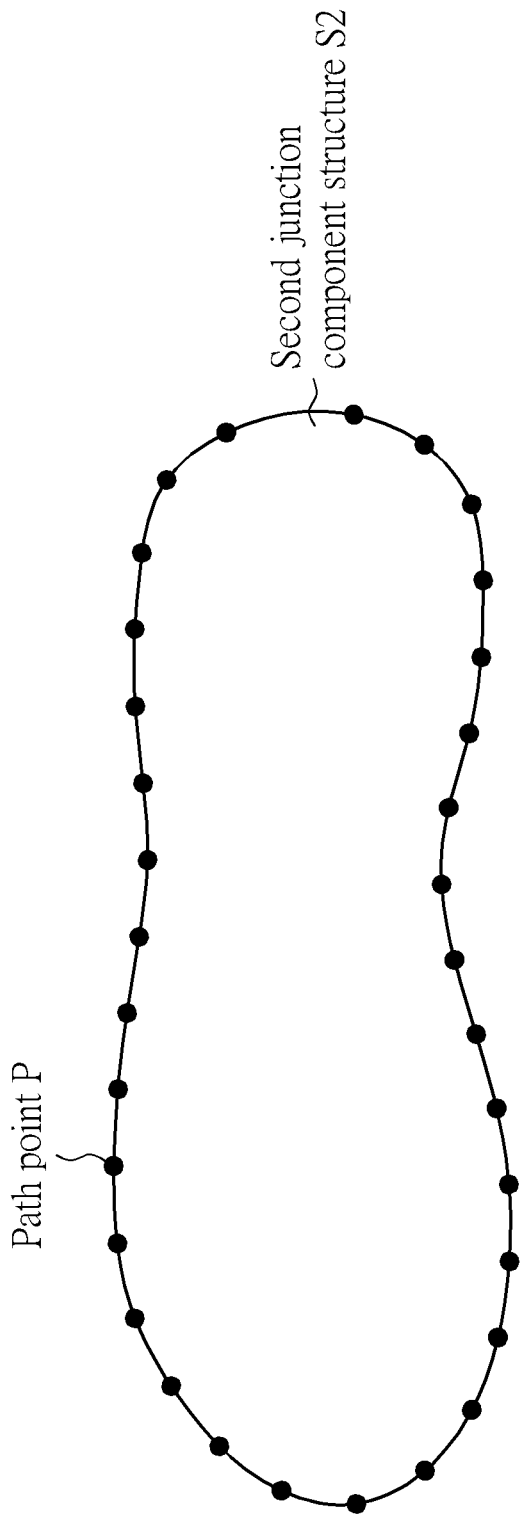
FIG. 10 is an illustration of generating a plurality of path points of the second junction component structure in the junction line data generation system in FIG. 1.

FIG. 10 is an illustration of generating a plurality of path points P of the second junction component structure S2 in the junction line data generation system 100. The processor 11 can set a plurality of path points P along a lower edge or an upper edge of a bottom side of the second junction component structure S2. For example, the processor 11 can set Q path points P. Q is a positive integer with a range within a couple of tens to a couple of hundreds. However, Q can be customized according to an actual situation. The plurality of path points P can be allocated to surround a bottom region of the second junction component structure S2. For the plurality of path points P, a distance between two adjacent path points can be a constant or a varied value. Further, positions of the plurality of path points P on the lower edge or the upper edge can also be customized by the user, or predetermined according to default parameters of the processor 11. In other words, the amount of path points P, positions of path points P, a distribution of path points P can be adjusted according to types of shoes. The plurality of path points P can be regarded as positioning points for adjusting the edge portion S2E of the second junction component structure S2 in FIG. 8 and FIG. 9. Further, the plurality of path points P can form a closed path. Therefore, the edge portion S2E of the second junction component structure S2 can be adjusted according to the closed path formed by the path points P.

Figure 11:
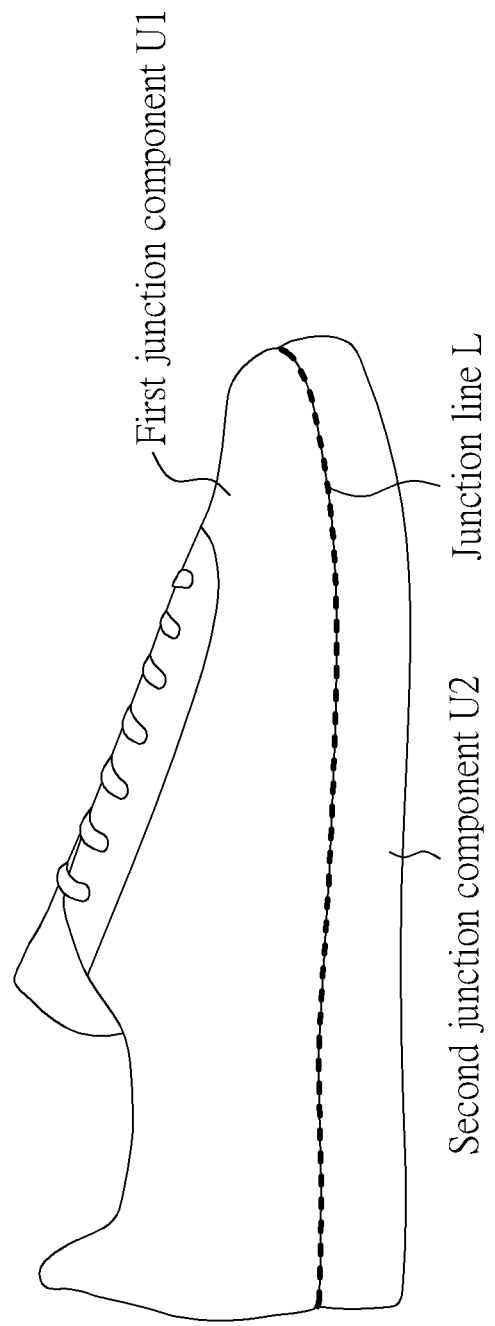
FIG. 11 is an illustration of generating junction line data of the first junction component and the second junction component in the junction line data generation system in FIG. 1.

FIG. 11 is an illustration of generating junction line data of the first junction component U1 and the second junction component U2 in the junction line data generation system 100. After the first junction component S1 and the second junction component S2 are virtually attached, a distance between the junction surface of the first junction component structure S1 and the junction surface of the second junction component structure S2 is substantially equal to zero. Then, the processor 11 can generate the junction line data. For example, the processor 11 can generate coordinate data of the junction line. Therefore, by using the junction line data, the junction line L between the first junction component U1 and the second junction component U2 can be optimized. Then, the first junction component U1 and the second junction component U2 can be closely attached according to the junction line L. Further, a position of the junction line L is not limited in FIG. 11. For example, the position of the junction line L can be slightly adjusted according to the actual situation.

Figure 12:
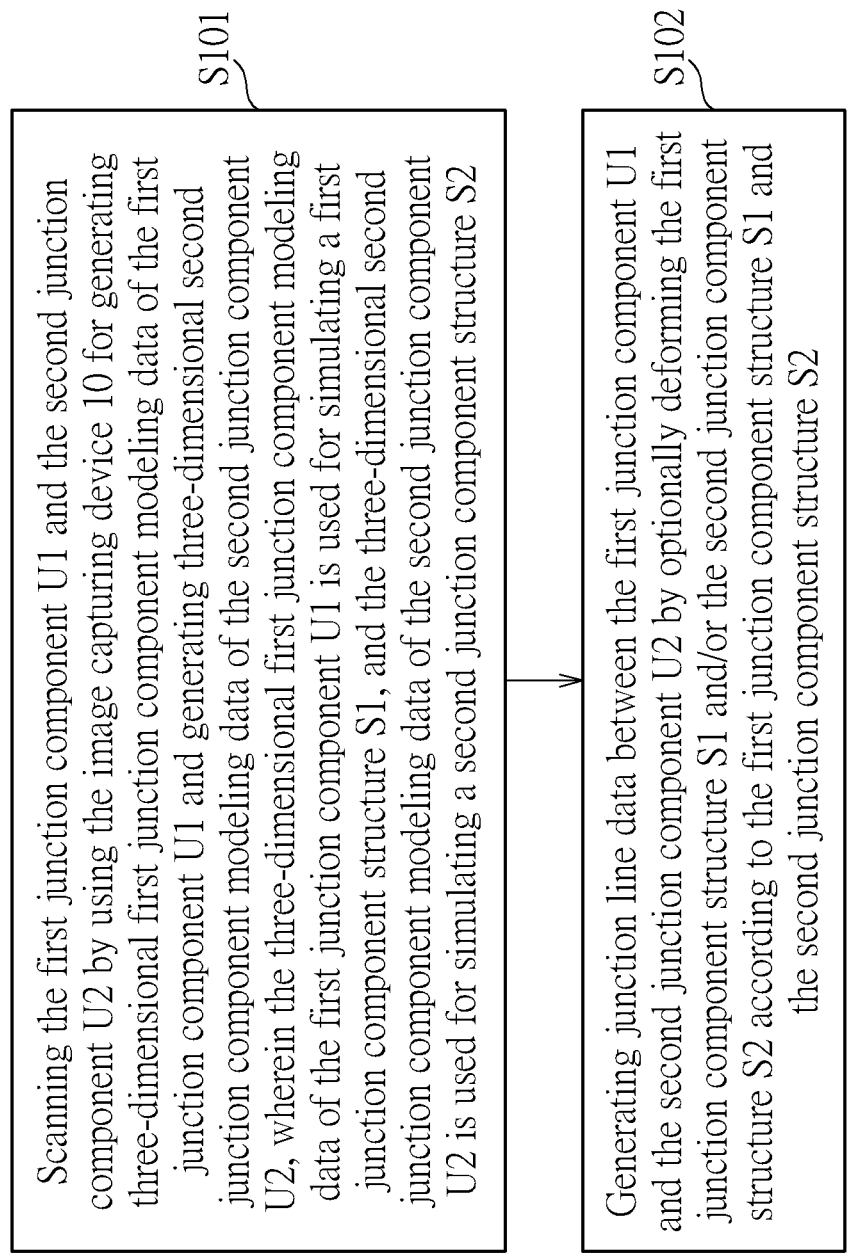
FIG. 12 is a flow chart of a junction line data generation method performed by the junction line data generation system in FIG. 1.

FIG. 12 is a flow chart of a junction line data generation method performed by the junction line data generation system 100. The junction line data generation method includes step S101 and step S102, as illustrated below.

step S101: scanning the first junction component U1 and the second junction component U2 by using the image capturing device 10 for generating three-dimensional first junction component modeling data of the first junction component U1 and generating three-dimensional second junction component modeling data of the second junction component U2, wherein the three-dimensional first junction component modeling data of the first junction component U1 is used for simulating a first junction component structure S1, and the three-dimensional second junction component modeling data of the second junction component U2 is used for simulating a second junction component structure S2;

step S102: generating junction line data between the first junction component U1 and the second junction component U2 by optionally deforming the first junction component structure S1 and/or the second junction component structure S2 according to the first junction component structure S1 and the second junction component structure S2.

Details of step S101 to step S102 are previously illustrated. Thus, they are omitted here. Step S101 to step S102 can include a three-dimensional modeling process, an alignment process, a deformation process, a path point sampling process, and a bite line generation process. By using the junction line data generation system 100, the footwear equipment manufacturer can use an automated process for generating bite line data, thereby reducing labor costs and human error rate in subsequent elastomer processing stages. Further, step S102 can be flexibility modified according to the actual situation. For example, when the junction line data generation system 100 generates the junction line data between the first junction component U1 and the second junction component U2, the processor 11 can only deform the first junction component structure S1, only deform the second junction component structure S2, or deform both of the first junction component structure S1 and the second junction component structure S2. Any reasonable deformation method falls into the scope of the present invention.

The junction line data generation system 100 can be applied to shoemaking technology, including processing the upper of the shoe, processing the sole of the shoe, and performing a fitting process between the upper of the shoe and the sole of the shoe. Since the junction line data generation system 100 can generate digital data of simulated three-dimensional models, a shoemaking production process can be optimized automatically, thereby reducing labor costs and increasing reliability. For processing the upper of the shoe, the junction line data generation system 100 can be used for generating a processing path of subsequent elastomer processing stages, such as positions and ranges configuration of an accent, accessories, adhesive of Achilles protections. The junction line data generation system 100 can also be used for generating a virtual alignment path of a collar foam, a collar lining, a collar patch, or an HF emboss/stitching process. Further, the junction line data generation system 100 can be used for determining range configurations and offset configurations of a roughing path and a grinder path. The junction line data generation system 100 can be used for configuring a heel height and a base of the shoe, and optimized to execute a spraying process or a brushing process.

For processing the sole of the shoe, the junction line data generation system 100 can also be used for generating a processing path of subsequent elastomer processing stages, such as processing a bottom filler of a bottom design, a bottom view of bottom units, and a blueprint of the bottom. Further, the junction line data generation system 100 can also be used for performing comparisons of size patterns and marking spots.

For performing the fitting process between the upper of the shoe and the sole of the shoe, the junction line data generation system 100 can also be used for generating a processing path of subsequent elastomer processing stages, such as an assembly process, a real-time pairing process, a range confirmation of textures, a tilt degree confirmation of a heel lift. The junction line data generation system 100 can also be used comparing a bottom centerline with a last centerline or a heel centerline for determining a height of a heel cup and its back view.

To sum up, the present invention discloses a junction line data generation method and a junction line data generation system. The junction line data generation system can generate data of junction line between two elastic junction components. The junction line data generation system can be applied to a shoemaking production process for footwear equipment manufacturers. The junction line data generation system can perform a three-dimensional modeling establishment process of a first junction component and a second junction component. The junction line data generation system can optimize three-dimensional model structures. Therefore, a comparison process of several sample models or templates is not required for the junction line data generation system. Therefore, the junction line data generation system can provide an automated production process. Further, since the three-dimensional model structures can be optimized, the junction line data generation system can generate the bite line data for reducing labor costs and human error rate in subsequent elastomer processing stages.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A junction line data generation method comprising:
scanning a first junction component and a second junction component by using an image capturing device for generating three-dimensional first junction component modeling data of the first junction component and generating three-dimensional second junction component modeling data of the second junction component;
simulating a first junction component structure by using the three-dimensional first junction component modeling data of the first junction component;
simulating a second junction component structure by using the three-dimensional second junction component modeling data of the second junction component; and
generating junction line data between the first junction component and the second junction component by optionally deforming the first junction component structure and/or the second junction component structure according to the first junction component structure and the second junction component structure;
wherein the first junction component and/or the second junction component is an elastic component, and the first junction component and the second junction component are closely attached according to the junction line data.

2. The method of claim 1, further comprising:
setting the first junction component as a scanning target by the image capturing device;
the image capturing device moving along a nonlinear path for scanning the first junction component; and
generating a plurality of images with different angles of view corresponding to the first junction component after the image capturing device moves along the nonlinear path;
wherein the nonlinear path is a closed path or a spiral path.

3. The method of claim 1, further comprising:
acquiring a first orientation vector of the first junction component structure and a second orientation vector of the second junction component structure according to the three-dimensional first junction component modeling data and the three-dimensional second junction component modeling data; and
aligning the first junction component structure with the second junction component structure according to the first orientation vector and the second orientation vector.

4. The method of claim 1, further comprising:
generating a plurality of deforming regions by converting at least a part of the second junction component structure into a plurality of lattices;
acquiring a plurality of correlations between the plurality of deforming regions and a side of the first junction component structure; and
adjusting a deforming degree of at least one deforming region for closely attaching the second junction component structure with the first junction component structure according to the plurality of correlations.

5. The method of claim 1, further comprising:
acquiring an angle between an edge portion of a bottom side of the second junction component structure and the bottom side of the second junction component structure; and
adjusting the edge portion of the bottom side of the second junction component structure according to the angle and an edge of one side of the first junction component structure;
wherein a junction surface of the first junction component structure is fitted perfectly with a junction surface of the second junction component structure after the edge portion of the bottom side of the second junction component structure is adjusted.

6. The method of claim 1, further comprising:
setting a plurality of path points P along a lower edge or an upper edge of a bottom side of the second junction component structure.

7. The method of claim 1, wherein the first junction component is an upper of a shoe, the second junction component is a sole of the shoe, the junction line data is bite line data, and the upper of the shoe and the sole of the shoe are closely attached according to the bite line data.

8. A junction line data generation system comprising:
an image capturing device configured to scan a first junction component and a second junction component;
a processor coupled to the image capturing device and configured to process three-dimensional modeling data of the first junction component and the second junction component, and configured to generate junction line data accordingly; and
a memory coupled to the processor and configured to buffer the three-dimensional modeling data;
wherein after the first junction component and the second junction component are scanned by the image capturing device, the processor generates three-dimensional first junction component modeling data of the first junction component to the memory, generates three-dimensional second junction component modeling data of the second junction component to the memory, the processor uses the three-dimensional first junction component modeling data of the first junction component for simulating a first junction component structure, the processor uses the three-dimensional second junction component modeling data of the second junction component for simulating a second junction component structure, the processor generates the junction line data between the first junction component and the second junction component by optionally deforming the first junction component structure and/or the second junction component structure according to the first junction component structure and the second junction component structure, the first junction component and/or the second junction component is an elastic component, and the first junction component and the second junction component are closely attached according to the junction line data.

9. The system of claim 8, wherein the image capturing device sets the first junction component as a scanning target and moves along a nonlinear path for scanning the first junction component, the image capturing device generates a plurality of images with different angles of view corresponding to the first junction component after the image capturing device moves along the nonlinear path, the nonlinear path is a closed path or a spiral path.

10. The system of claim 8, wherein the processor acquires a first orientation vector of the first junction component structure and a second orientation vector of the second junction component structure according to the three-dimensional first junction component modeling data and the three-dimensional second junction component modeling data, and aligns the first junction component structure with the second junction component structure according to the first orientation vector and the second orientation vector.

11. The system of claim 8, wherein the processor generates a plurality of deforming regions by converting at least a part of the second junction component structure into a plurality of lattices, acquires a plurality of correlations between the plurality of deforming regions and a side of the first junction component structure, and adjusts a deforming degree of at least one deforming region for closely attaching the second junction component structure with the first junction component structure according to the plurality of correlations.

12. The system of claim 8, wherein the processor acquires an angle between an edge portion of a bottom side and the bottom side of the second junction component structure, adjusts the edge portion of the bottom side of the second junction component structure according to the angle and an edge of one side of the first junction component structure, and a junction surface of the first junction component structure is fitted perfectly with a junction surface of the second junction component structure after the edge portion of the bottom side of the second junction component structure is adjusted.

13. The system of claim 8, wherein the processor sets a plurality of path points along a lower edge or an upper edge of a bottom side of the second junction component structure.

14. The system of claim 8, wherein the first junction component is an upper of a shoe, the second junction component is a sole of the shoe, the junction line data is bite line data, and the upper of the shoe and the sole of the shoe are closely attached according to the bite line data.

\* \* \* \* \*